(12) United States Patent
Johnson

(10) Patent No.: US 6,264,009 B1
(45) Date of Patent: Jul. 24, 2001

(54) MULTI-STAGE WET DISC BRAKE

(75) Inventor: Michael E. Johnson, Rochester, MI (US)

(73) Assignee: Meritor Heavy Vehicle Systems, LLC, Troy, MI (US)

( * ) Notice: Subject to any disclaimer, the term of this patent is extended or adjusted under 35 U.S.C. 154(b) by 0 days.

(21) Appl. No.: 09/325,273

(22) Filed: Jun. 3, 1999

(51) Int. Cl.⁷ ...................................................... F16D 55/26
(52) U.S. Cl. ........................ 188/72.6; 188/72.7; 188/71.5; 188/72.4; 192/70.15; 192/70.23; 192/70.25; 192/52.1; 192/85 AA; 192/86; 192/111 A
(58) Field of Search ................................ 192/70.21, 52.5, 192/70.15, 70.23, 52.1, 111 A, 70.25, 85 AA, 86; 188/72.6, 71.5, 196 A, 196 C, 72.4, 72.7

(56) References Cited

U.S. PATENT DOCUMENTS

| | | | |
|---|---|---|---|
| 3,262,531 | * 7/1966 | Black et al. ........................... 192/87 |
| 3,869,024 | * 3/1975 | Hauth et al. ........................ 188/72.5 |
| 3,927,737 | * 12/1975 | Prillinger et al. ................. 188/106 F |
| 3,995,721 | * 12/1976 | Chambers ........................... 188/71.8 |
| 4,174,025 | * 11/1979 | Ivachev ............................... 188/72.6 |
| 4,195,714 | * 4/1980 | Massing ............................... 188/71.5 |
| 4,412,603 | * 11/1983 | Bischoff ............................ 188/106 P |
| 4,496,033 | * 1/1985 | Hall et al. ............................ 188/347 |
| 4,664,242 | * 5/1987 | Downs ............................ 192/106 F |
| 4,974,714 | * 12/1990 | Goscenske, Jr. ................ 192/85 CA |
| 5,072,811 | * 12/1991 | Everhard .............................. 188/72.4 |
| 5,603,396 | * 2/1997 | Murata et al. ................... 192/85 AA |
| 5,685,399 | * 11/1997 | Butler et al. ....................... 188/196 A |
| 5,791,447 | * 8/1998 | Lamela et al. .................... 192/70.25 |

FOREIGN PATENT DOCUMENTS

2074672 * 11/1981 (GB) .................................. 188/72.6

\* cited by examiner

Primary Examiner—Robert J Oberleitner
Assistant Examiner—Benjamin A. Pezzlo
(74) Attorney, Agent, or Firm—Carlson, Gaskey & Olds

(57) ABSTRACT

A multi-stage wet disc brake assembly has a first actuator is supported within a housing and moveable toward point of friction discs. A second actuator coacts with the first actuator and is moveable relative to the first actuator toward the friction discs. One of the actuators reduces the running clearance between the friction discs and the other of the actuators forces the friction discs together to slow rotation of a rotatable member relative to the housing when the rotatable member is being driven.

9 Claims, 4 Drawing Sheets

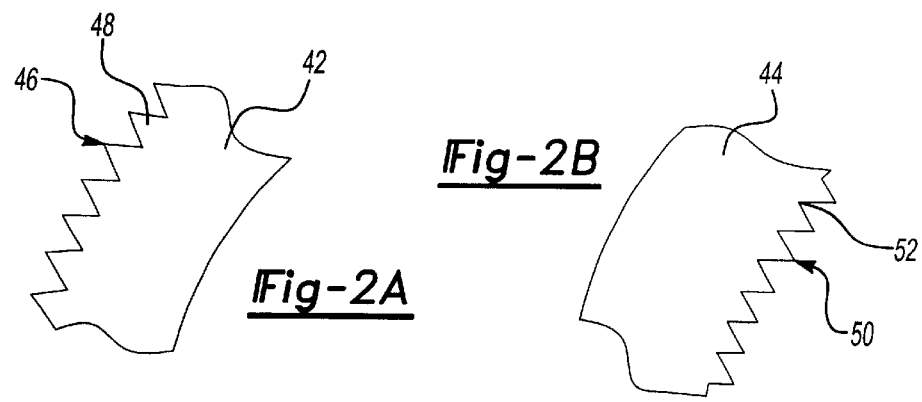
Fig-2A
Fig-2B
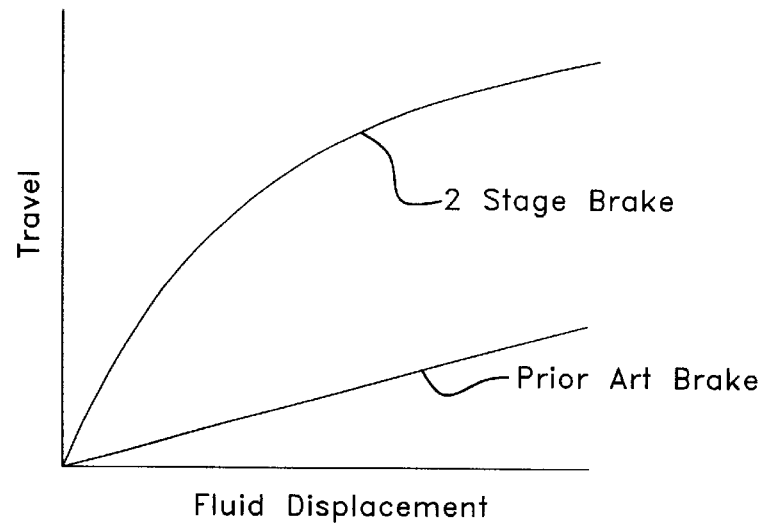
Fig-3
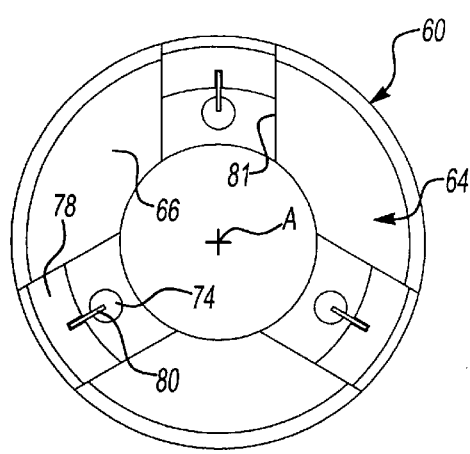
Fig-4C

MULTI-STAGE WET DISC BRAKE

BACKGROUND OF THE INVENTION

This invention relates to a wet disc brake assembly having a first stage for reducing the clearance between the discs and a second stage for applying force to the discs to increase the braking torque.

Wet disc brake assemblies are used in vehicles such as lift trucks, front-end loaders and in other devices. Each brake assembly has a disc pack that includes two sets of discs that rotate relative to one another. One set of discs is coupled to a stationary housing, and the other set of discs is coupled to a rotatable member attached to a wheel or some other driven member.

When the brakes are applied by a vehicle operator, a hydraulic piston forces the discs together to increase the friction between them thereby decreasing the relative speed between the sets of discs and slowing the driven member. Typically, clearance must be provided between the discs to minimize parasitic losses resulting from friction between the discs when the brakes are not applied.

More hydraulic fluid is required with greater clearance between the discs. Further, since the piston must travel farther with greater clearance between the discs is used, the brake-apply times inevitably increase.

Therefore, it is desirable to provide a wet disc brake assembly that has a clearance between the discs that results in minimal friction when the brakes are not applied while avoiding increases in the amount of hydraulic fluid necessary or brake-apply times.

SUMMARY OF THE INVENTION AND ADVANTAGES

The present invention provides a multi-stage wet disc brake assembly that has a spindle that defines an axis of rotation. A housing is fixed relative to the spindle and has an inner surface with a plurality of splines. A rotatable member is supported on the spindle and is rotatable about the spindle. The rotatable member has an outer portion with a plurality of splines disposed within the housing opposite the inner surface. First and second sets of friction discs are mounted adjacent to one another in an alternating relationship and have a running clearance between them. The first set of friction discs have an outer perimeter with a plurality of splines in interlocking and sliding relation with the plurality of inner surface splines. The second set of friction discs have an inner perimeter with a plurality of splines in interlocking and sliding relation with the plurality of outer portion splines.

A first actuator is supported within the housing and is moveable toward one of the friction discs. A second actuator coacts with the first actuator and is moveable relative to the first actuator toward one of the friction discs. One of the actuators reduces the running clearance and the other actuator forces the friction discs together to slow rotation of the rotatable member relative to the housing when the rotatable member is being driven.

Accordingly, the above method provides a multi-stage wet disc brake assembly that has one actuator for reducing the running clearance and another actuator for braking the rotatable member so that brake-apply times may be decreased without decreasing the running clearance.

BRIEF DESCRIPTION OF THE DRAWINGS

Other advantages of the present invention can be understood by reference to the following detailed description when considered in connection with the accompanying drawings wherein:

FIG. 2A is a partial view of a first set of friction discs;

FIG. 2B is a partial view of a second set of friction discs;

FIG. 3 is a graph of fluid displacement versus piston travel of the present invention compared to prior art wet disc brakes;

FIG. 4C is a view taken along line 4C—4C in FIG. 4B;

DETAILED DESCRIPTION OF THE PREFERRED EMBODIMENT

Figure 1:
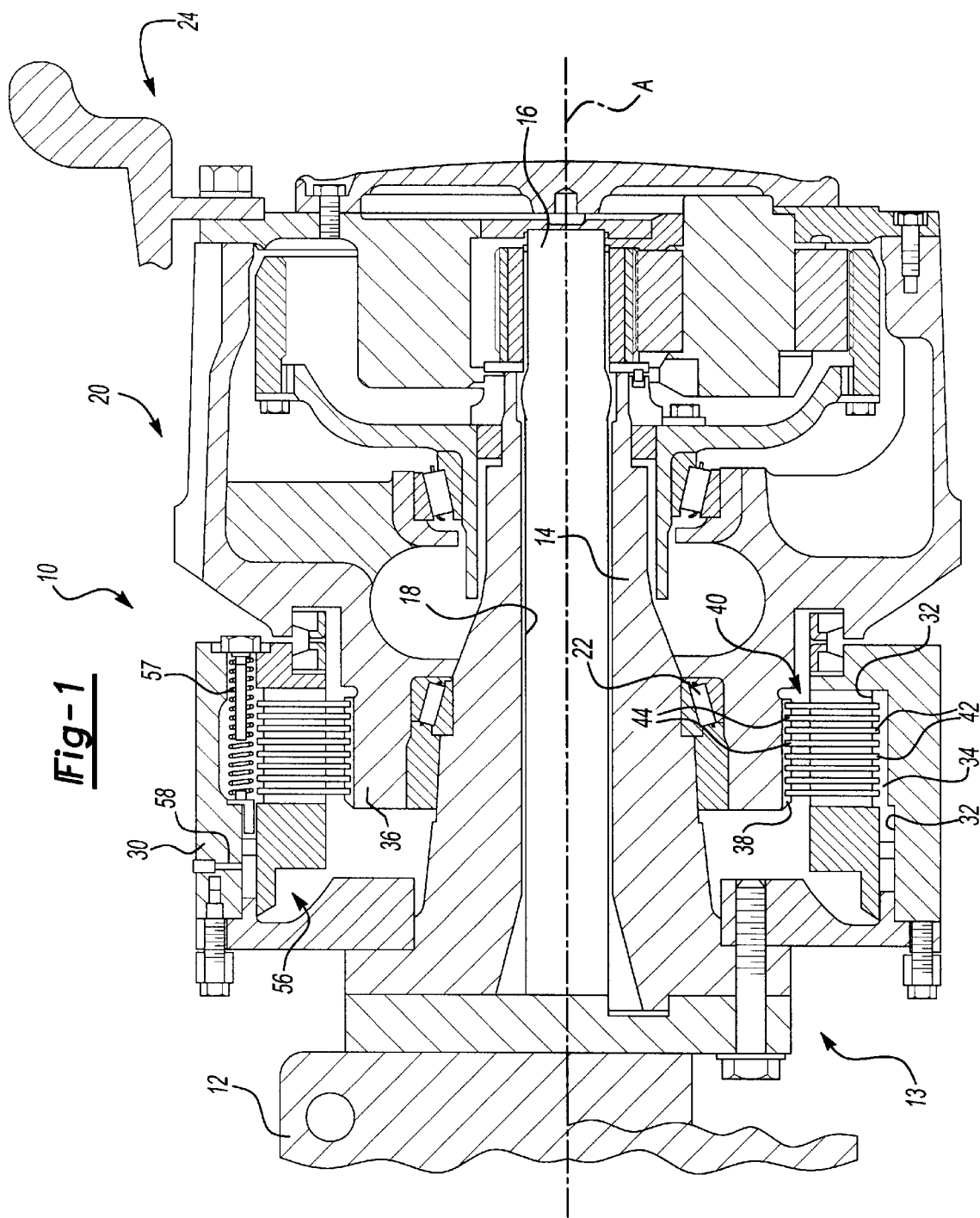
FIG. 1 is a cross-sectional view of the present invention multi-stage wet disc brake assembly.

Referring to FIG. 1, a multi-stage wet disc brake assembly 10 is supported by an axle housing 12. Specifically, axle housing 12 has an end 13 to which a spindle 14 is secured. Axle housing 12 houses a shaft 16 that rotates about an axis A. Shaft 16 extends from axle housing 12 and through a bore 18 in spindle 14, which has a central axis common with axis A. A rotatable member 20 is supported on spindle 14 by bearings 22 so that rotatable member 20 may rotate about axis A. A wheel assembly 24 is secured to rotatable member 20. Shaft 16 is splined to rotatable member 20 so that power from the engine and transmission may be transmitted through the axle shaft 16 and to the wheel assembly 24.

A brake housing 30 is secured to spindle 14 and axle housing 12 so that brake housing 30 is rotationally fixed relative to rotatable member 20. Brake housing 30 has an inner surface 32 with a plurality of splines 34. Rotatable member 20 has an outer portion or surface 36 with a plurality of splines 38 disposed within brake housing 30 opposite inner surface 32. A clutch pack 40 interposed between brake housing 30 and rotatable member 20 acts to slow rotatable member 20 when it is being driven by shaft 16.

Clutch pack 40 has a first 42 and second 44 set of friction discs adjacent one another in an alternating relationship. That is, a friction disc from the first set 42 is next to a friction disc from the second set 44, and visa versa, so that each friction disc is not next to another friction disc from the same set. First set of friction discs 42 each have an outer perimeter 46 with a plurality of splines or notches 48, shown in FIG. 2A. First set of friction discs 42 are disposed within brake housing 30 so that splines 48 are in interlocking and sliding relation with a plurality of inner surface splines 34. In this manner, the first set of friction discs 42 are permitted to move along axis A but are not permitted to rotate about axis A.

Second friction discs 44 are arranged axially along outer portion 36 and have an inner perimeter 50 with a plurality of splines or notches 52, shown in FIG. 2B. Second set of friction discs 44 are in interlocking and sliding relation with outer portion splines 38 so that discs 44 are permitted to move along axis A and rotate about axis A with rotatable member 20.

When rotatable member 20 is driven by shaft 16, second set of friction discs 44 rotate relative to first set of friction discs 42. In order to slow down or brake rotatable member 20, friction discs 42,44 are forced together to increase the friction between friction discs 42,44. Friction discs 42,44 have a running clearance 45, or a slight gap, between them so that there is a minimal amount of friction generated when rotatable member 20 is rotating relative to brake housing 30 when the brakes are not applied. Prior art systems have typically utilized a single hydraulic actuator to force friction discs 42,44 together. As mentioned above, the drawbacks of these prior art systems are increased brake-apply times and larger requirement of hydraulic fluid resulting from the clearance between friction discs 42,44. Designing a single actuator system to achieve a reduced clearance would yield parasitic losses due to increases in friction in situations where the brakes are not applied.

With continuing reference to FIG. 1, an actuator assembly 56 is disposed within the brake housing 30 and slides against the inner surface 32 along axis A toward clutch pack 40. A return spring 57 has a spring force that biases actuator assembly 56 away from clutch pack 40 so that there is running clearance between friction discs 42,44 (best shown in FIGS. 4A and 4B at 45) when the brakes are not applied. A hydraulic passage 58 is in communication with a portion of the actuator assembly 56 to apply a hydraulic force to actuator assembly 56 to move it toward clutch pack 40 and force friction discs 42,44 together. However, it is to be understood that actuation mechanisms other than hydraulic devices may be used. The spring force must be overcome by the hydraulic force before actuator assembly 56 will begin to move toward clutch pack 40. In the prior art, only one actuator is used, whereas in the present invention two actuators are used.

Referring to FIG. 3, a graph of fluid displacement versus piston travel of the present invention compared to prior art wet disc brakes for the same running clearance is shown. The two stage wet disc brake of the present invention travels a greater distance for the same amount of fluid displacement than typical single hydraulic actuator systems. The two stage brake assembly of the present invention enables less fluid to be used and decreases brake-apply times while still retaining a suitable running clearance. The reasons will be explained below.

Figure 4A:
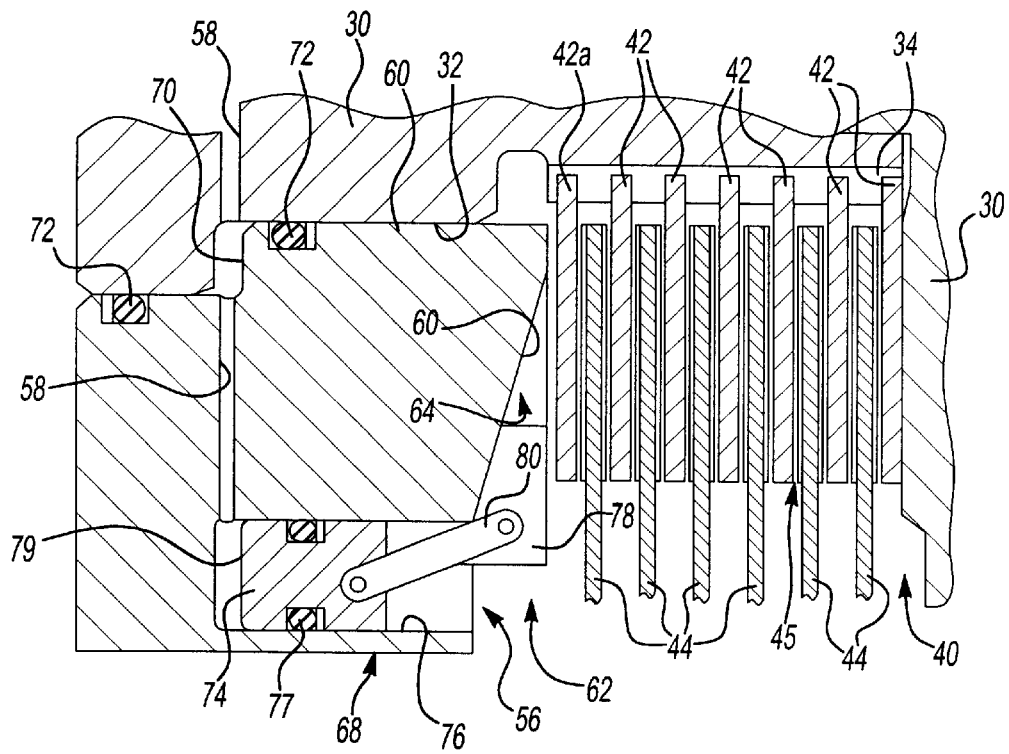
FIG. 4A is an enlarged cross-sectional view of the present invention shown in FIG. 1 in the unactuated position.
Figure 4B:
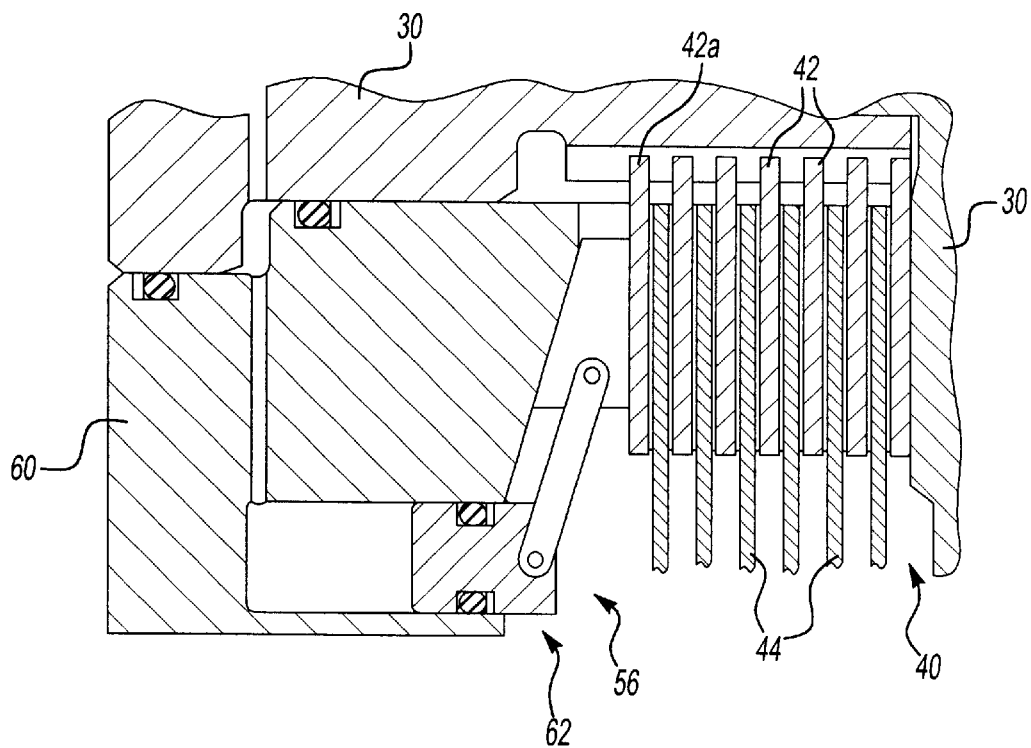
FIG. 4B is cross-sectional view similar to FIG. 4A with the present invention in the actuated position.

Referring now to FIGS. 4A–4C, the actuator assembly 56 of the present invention has a first actuator 60 supported within housing 30. In the preferred embodiment, first actuator 60 is a hydraulic piston and inner surface 32 acts as a cylinder in which the first actuator 60 slides axially. Actuator assembly 56 also has a second actuator 62 that coacts with first actuator 60 to apply the brakes. That is, second actuator 62 moves relative to first actuator 60 so that actuators 60,62 cooperate with one another to move friction discs 42,44 towards one another. Clutch pack 40 is arranged between housing 30 and actuators 60,62 so that when the brakes are applied actuators 60,62 force friction discs 42,44 together and against housing 30. Preferably, one of the actuators 60,62 primarily reduces the running clearance 45 and the other of the actuators 60,62 primarily forces friction discs 42,44 together to slow rotation of rotatable member 20 relative to housing 30.

First actuator 60 is an annular hydraulic piston having a face 64 proximate to one of the first sets of friction discs 42a. Face 64 has a portion 66 tapering to an inner perimeter 68, which is adjacent spindle 16 (not shown). On a side opposite face 64, first actuator 60 has an annular first hydraulic area 70 sealed off by seals 72 that are interposed between housing 30 and first actuator 60 on either side of hydraulic passage 58. Hydraulic passage 58 is in fluid communication with first hydraulic area 70.

Second actuator 62 is comprised of a plurality of second hydraulic pistons 74 received in bores 76 arranged radially about first actuator 60, as best seen in FIG. 4C. Each second hydraulic piston 74 has a seal 77 that creates a seal between piston 74 and bore 76. Second hydraulic piston 74 has a second hydraulic area 79 in fluid communication with a portion of hydraulic passage 58 that passes through first actuator 60 to bore 76.

Each second hydraulic piston 74 has a pad 78 adjacent to portion 66 for sliding up and down the tapered surface of face 64. Pads 78 are attached to second hydraulic pistons 74 by arms 80. Pads 78 move in a channel 81 (FIG. 4C) in face 64 so that they move radially along face 64.

FIG. 4A depicts the actuators 60,62 in the unactuated position in which the brakes are not applied. FIG. 4B depicts the second actuator 62 actuated and the running clearance 45 reduced. In operation, when the brakes are applied hydraulic fluid is pumped into hydraulic passage 58 and the hydraulic force increases. Because of the spring force that is applied to first actuator 60 and because the total of second hydraulic areas 79 is less than first hydraulic area 70, second pistons 74 are forced toward friction disc 42a. As second piston 74 moves, pad 78 moves up tapered portion 66 and outward against friction disc 45 until running clearance 45 is reduced. When the hydraulic force is greater than the spring force, first actuator 60 will begin to move toward friction disc 42a and apply a braking force to friction discs 42,44. Thus, the time and fluid, which in the prior art would be wasted while overcoming the spring force, is instead used to take up the running clearance.

It is to be understood that the present invention is not limited to the configuration shown. That is, the second actuator 62 may be arranged behind the first actuator 60, or opposite the friction disc 42a. Further, the invention is not limited to the use of hydraulic pistons, as demonstrated by the alternative embodiment discussed below.

Figure 5A:
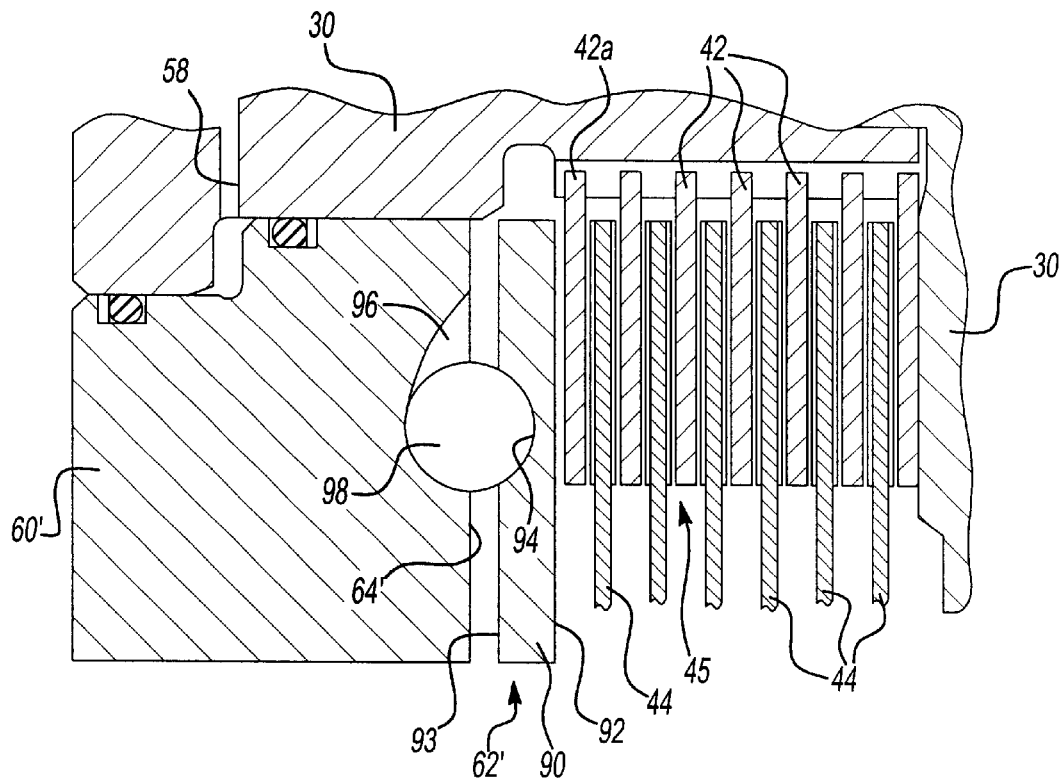
FIG. 5A is a cross-sectional view of an alternative embodiment of the present invention in the unactuated position.
Figure 5B:
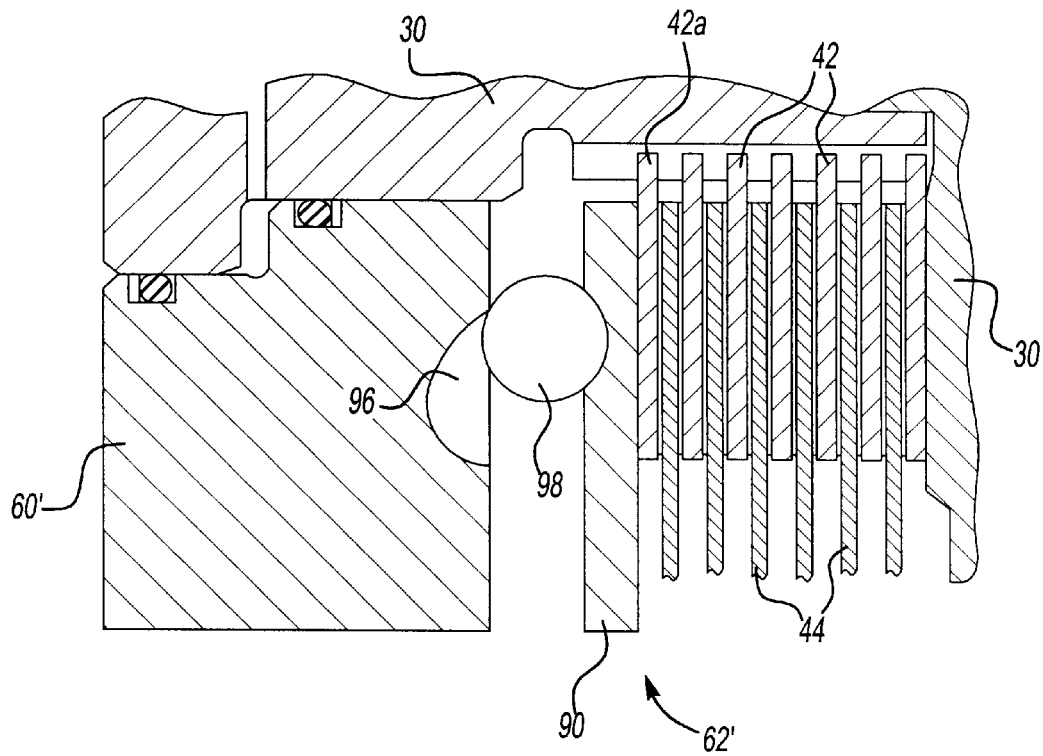
FIG. 5B is cross-sectional view similar to FIG. 5A with the present invention in the actuated position.

Referring to FIG. 5A the second actuator 62' is shown using a ball ramp known in the art. Second actuator 62' has an annular plate 90 with a face 92 proximate to friction disc 42a. Opposite face 92 is a surface 93 with a plurality of pockets 94 (only one shown) arranged radially about surface 93. First actuator 60' has a face 64' with a plurality of sloped pockets 96 arranged opposite pockets 94. A plurality of balls 98 are interposed between pockets 94, 96. Second actuator 62' is rotated relative to first actuator 60'to move second actuator toward friction disc 42a and reduce running clearance 45, as shown in FIG. 5B. Second actuator 62' may be rotated relative to first actuator 60' in any manner known in the art or any other suitable manner. In the embodiment, second actuator 60' is preferably rotated while the first actuator is awaiting the spring force to be overcome.

The invention has been described in an illustrative manner, and it is to be understood that the terminology that has been used is intended to be in the nature of words of description rather than of limitation. Obviously, many modifications and variations of the present invention are possible in light of the above teachings. It is, therefore, to be understood that within the scope of the appended claims the invention may be practiced otherwise than as specifically described.

What is claimed is:

1. A multi-stage wet disc brake assembly comprising:
   a fixed housing having a cylinder portion;
   a rotatable member rotatable about an axis of rotation relative to said housing;
   a first and second set of friction discs adjacent one another in an alternating relationship and having a running clearance therebetween, said first set of friction discs in interlocking and sliding relation with said housing, said second set of friction discs in interlocking and sliding relation with said rotatable member;

a first actuator including an annular first hydraulic piston supported within said cylinder portion, said first hydraulic piston having a face with a portion tapering to an inner perimeter proximate to and being moveable toward one of said friction discs, said first hydraulic piston having bores spaced radially about said first hydraulic piston; and a second actuator including second hydraulic pistons disposed in said bores with said second hydraulic pistons interposed between said first hydraulic piston and said one of said friction discs, and a pad adjacent said tapered portion and attached to each of said second hydraulic pistons by an arm, said pads sliding along said tapered portion when said second hydraulic pistons are actuated thereby moving said pads toward said one of said friction discs along said axis of rotation to reduce said running clearance, wherein said second hydraulic pistons move prior to said first hydraulic piston and then said first hydraulic piston forces said friction discs together for slowing rotation of said rotatable member relative to said housing.

2. The assembly as set forth in claim 1 wherein said first and second hydraulic pistons have a first and second hydraulic area respectively, said assembly further comprising a common hydraulic passage in fluid communication with said hydraulic areas for carrying hydraulic fluid to said hydraulic areas to apply a hydraulic force to said hydraulic areas and actuate said first and second hydraulic pistons.

3. The assembly as set forth in claim 2 further comprising a return spring having a spring force disposed between said housing and said first hydraulic piston for biasing said first hydraulic piston away from said one of said friction discs, wherein when hydraulic fluid applies said force to said first and second hydraulic areas said second hydraulic piston is actuated until said force becomes greater than said spring force thereby actuating said first hydraulic piston.

4. The assembly as set forth in claim 2 wherein said first hydraulic area is greater than said second hydraulic area.

5. A method for applying a multi-stage wet disc brake comprising the steps of:

(a) moving a first hydraulic piston received within a housing relative to a second actuator toward one of a plurality of friction discs, the friction discs including a first and second set splined to a housing and a wheel assembly respectively with the sets being rotatable relative to one another and having a running clearance therebetween, wherein the second actuator includes at least one second hydraulic piston received within at least one bore in the first hydraulic piston, wherein each second hydraulic piston has a pad that slides along a tapered front face of the first actuator when actuated to reduce the running clearance;

(b) engaging the one of the plurality of friction discs with one of the first and second actuators, wherein the first actuator is proximate to the one of the plurality of friction discs and the second actuator is interposed between the first actuator and the one of the plurality of friction discs;

(c) reducing the running clearance;

(d) moving the first actuator toward the one of the plurality of friction discs; and (e) forcing the friction discs together for slowing rotation of one of the first and second sets of friction discs relative to the other set of the first and second friction discs.

6. The method as set forth in claim 5 wherein step (b) includes moving the second actuator toward the one of the plurality of friction discs and steps (b) and (c) occur simultaneously.

7. The method as set forth in claim 5 wherein step (d) and (e) occur simultaneously.

8. The method as set forth in claim 5 wherein the first and second pistons have a first and second hydraulic area respectively with the first hydraulic area being larger than the second hydraulic area, the method further comprises the steps of:

(f) delivering hydraulic fluid under pressure to the areas; and (g) applying a hydraulic force to the areas.

9. The method as set forth in claim 8 wherein the first actuator is biased away from the one of the plurality of friction discs by a return spring having a spring force, step (g) further including the steps of:

(g1) moving the second actuator to reduce the running clearance;

(g2) overcoming the spring force; and (g3) moving the first actuator to slow the first and second sets of friction discs relative to one another.

* * * * *